July 11, 1961 H. G. McCARTY 2,991,611
CROP CRUSHING AND CONDITIONING DEVICE
Filed Aug. 14, 1959
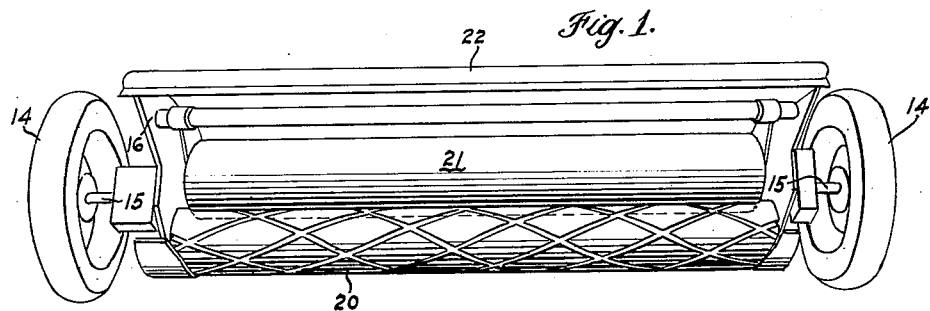
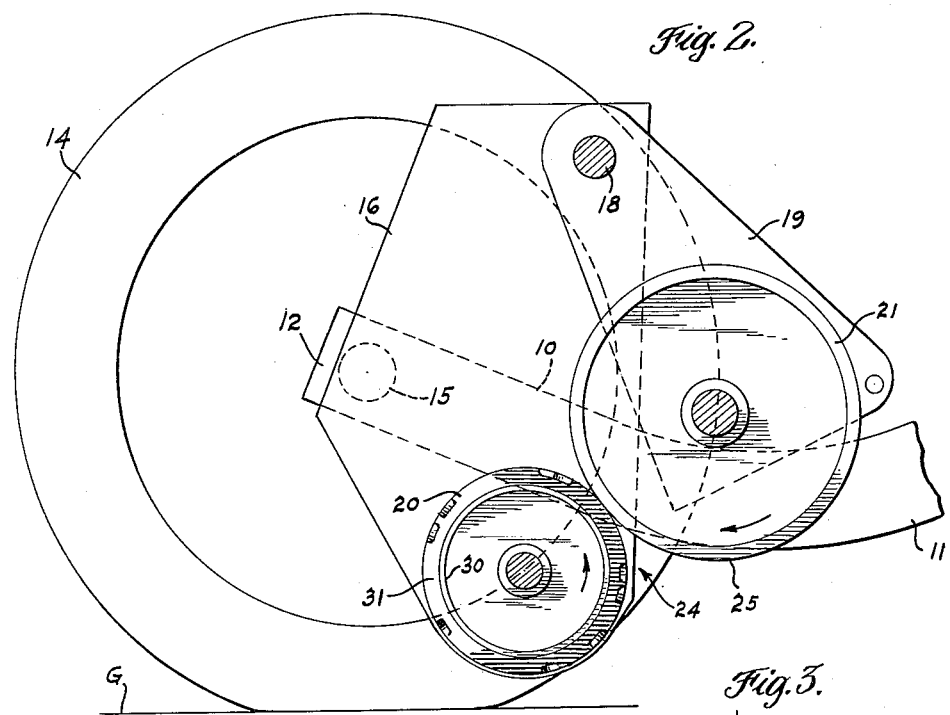
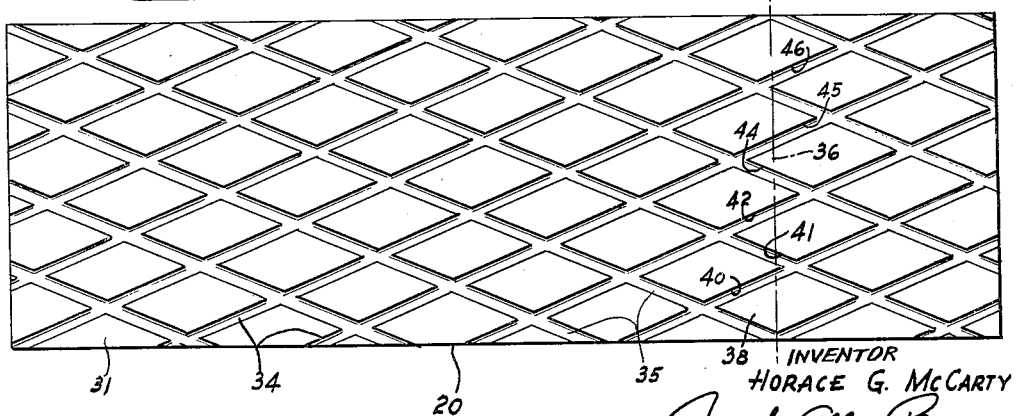
INVENTOR
HORACE G. McCARTY
By Joseph Allen Brown
ATTORNEY United States Patent Office 2,991,611
Patented July 11, 1961

2,991,611
CROP CRUSHING AND CONDITIONING DEVICE
Horace G. McCarty, New Holland, Pa., assignor to Sperry Rand Corporation, New Holland, Pa., a corporation of Delaware
Filed Aug. 14, 1959, Ser. No. 833,807
3 Claims. (Cl. 56—1)

This invention relates generally to hay conditioners and more particularly to hay crushers which crack the stems of the crop material from end to end to facilitate drying.

In recent years, hay conditioners have come into extensive use. Conditioners generally fall into two classes, namely, hay crimpers which crack the stems at spaced intervals to release moisture, and hay crushers which crush the full length of the stems to produce a more thorough moisture release. Crimpers conventionally have operated without a separate pick-up, one of the crimping rolls being adapted to engage and elevate the crop material. Likewise, it is known to provide a hay crusher which has no pick-up, the lower roll of the pair of crusher rolls being suitably adapted to engage and elevate the crop material. Generally, hay crushers which do not have a pick-up are a compromise somewhere between a crusher and a crimper. For example, the upper roll may be cylindrical and toothless while the lower roll may be provided with longitudinal ribs or slats of such width that the crop material is partly crushed and partly crimped as it passes between the cooperating rolls.

One object of this invention is to provide a hay crusher which has no separate pick-up and which produces crop conditioning superior to existing equipment.

Another object of this invention is to provide a hay conditioner in which the positioning of the rolls and the material from which they are constructed influence the hay conditioning results.

Another object of this invention is to provide a hay crusher having a lower roll which operates as both a pick-up and a crusher roll and has a resilient periphery grooved in a novel manner which assists in preventing clogging of the crusher rolls.

Other objects of this invention will be apparent hereinafter from the specification and from the recital in the appended claims.

In the drawing:

FIG. 1 is a rear view of a hay crusher constructed according to this invention;

FIG. 2 is an enlarged vertical section taken through the stud axle section of the righthand wheel of the crusher looking inwardly and showing in particular the relationship of the crusher rolls; and FIG. 3 is a view of the lower crusher roll extended flat and showing the groove pattern on the periphery of the roll.

Referring now to the drawing by numerals of reference, 10 indicates a support frame having a forward end 11 and a rear end 12. The forward end of the frame is adapted to be connected to and supported by the drawbar, not shown, of a tractor. The rear end of the frame is supported on ground wheels 14 connected to the frame by stud shafts 15. Laterally spaced relative to the direction of travel of the machine are vertically extending support plates 16 which are welded or otherwise affixed to the frame 10. Pivotally connected to the plates 16 at 18 are downwardly and forwardly extending support arms 19. Journalled adjacent the lower ends of plates 16 is a lower crusher roll 20; and journalled in the arms 19 is an upper crusher roll 21. Both rolls are shielded from above by a suitable hood 22 carried on the frame.

Drive means, not shown, is provided for rotating the respective crusher rolls in opposite directions, as indicated by the arrows on the rolls in FIG. 2. When the machine travels forwardly, left to right in FIG. 2, the lower crusher roll 20 moves close to the ground G and engages the crop material resting on the stubble and sweeps it upwardly and rearwardly. The upper crusher roll 21 engages the crop material from above and sweeps it rearwardly and upwardly. It will be noted that the upper roll is of substantially larger diameter than the lower roll. The rotational axis of upper roll 21 is disposed in a vertical plane which is forwardly of all portions of the lower roll. Likewise, the upper roll is disposed in a position vertically spaced from a horizontal axis including the axis of rotation of the lower roll 20. Such disposition of the rolls moves the bight 24 between the rolls closer to the ground, and upper roll 21 provides a live surface 25 of considerable extent above the crop material as the material moves toward lower roll 20. When the lower roll lifts the crop material upwardly and rearwardly, the upward movement is arrested by the overlying live surface 25 of roll 21. Such surface directs the crop material rearwardly and the respective rolls cooperate to pass the material between them. As the crop passes between the cooperative rolls, it is crushed and then deposited rearwardly onto the ground for drying.

Lower roll 20 comprises a cylindrical base member 30 which is covered with rubber 31 whereby the roll has some resiliency. The rubber can be applied to the member 30 in any suitable manner such as molding it thereon or applying rings of tire carcass or the like. The periphery of the roll is abrasive and provides a friction surface which will tend to catch onto and move the crop material engaged by it. To facilitate and increase the frictional engagement of the roll 20 with the crop material, the rubber portion of the roll has a diagonal set of grooves 34 which extend parallel to each other and an oppositely extending second set of diagonal grooves 35. The number of grooves in set 34 is different from the number of grooves in set 35. Specifically, there are nine grooves in set 34 and eleven grooves in set 35. As a result, the diamond pattern formed provides sections which are longer in one direction than the other. The advantage of this structure can be seen from the dotted line 36 across the roll.

If material tends to become lodged between the crushing rolls, it will be engaged by the edges formed by the grooves. As shown in FIG. 3, and looking from the bottom up, material lodged in alignment with line 36 is first engaged by section 38 at a corner thereof. Then it is engaged successively by edges 40, 41, 42, 44, 45 and 46. Engagement of the material with different edge portions of each section formed by the grooves has a substantial dislodging effect upon the material and protects against the mechanism becoming jammed. The normal flexing of the rubber provides self cleaning and further assists in preventing clogging.

The upper roll 21 is made of steel or the like and is rigid. While the lower roll will flex responsive to the movement of material between the rolls, the upper roll will not. This provides a much better crushing action than when two rubber rolls are used and provides less leaf shattering than when two metal rolls are used. Therefore, the use of two crushing rolls one of which is rubber and one of which is steel, the lower roll being used as a pick-up and the upper roll being used for crushing qualities, produces a highly efficient arrangement able to condition crop material with an efficiency heretofore unavailable.

Further, having an upper roll which is much larger than the lower roll and displaced forwardly relative thereto has functional feeding advantages. A lower throat 24 is provided which renders the feeding of material through the rolls more effective. It has been found that a lower rubber roll eight inches in diameter and an upper steel roll twelve inches in diameter provides an effective combination. Moreover, the combination is less expensive than when two rubber rolls are used.

The coefficient of friction of the lower rubber roll is higher than the coefficient of friction of upper steel roll, which compensates, in part, for its smaller diameter and enables it to exert a feeding effect on the material commensurate with the feeding effect of the upper roll. Further, the grooves in the lower roll, augment the pick-up and feeding action of roll 20 and produces a balanced feed action in cooperation with the upper roll.

In forming grooves 34 and 35, approximately thirty percent of the surface of the lower roll is removed. Nevertheless, the quality of crushing is substantially equal to the crushing action secured when two crushing rolls are used having peripheries which are not grooved. For satisfactory crushing performance, roll removal by grooving should not exceed about thirty-five percent; and for pick-up and feeding qualities, the grooving is preferably not under twenty-five percent.

While this invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A machine for crushing previously cut crop material resting on the ground comprising a mobile frame adapted to travel forwardly, a lower pick-up crusher roll, means mounting said lower roll on said frame in relatively close proximity to the ground whereby it engages said crop material on said travel of said frame, means rotating said lower roll in such direction that crop material so engaged is lifted and passed over the lower roll, an upper crusher roll mounted on said frame in crop crushing relation to said lower roll, said upper roll being located forwardly of said lower roll and spaced from the ground substantially further than the lower roll whereby the upper roll passes over said crop material on said travel of the frame, said lower roll being resilient and having a periphery with a relatively high coefficient of friction whereby the lifting and feeding of said crop material is facilitated, said upper roll being rigid and having a periphery with a substantially lower coefficient of friction than said lower roll, and said upper roll being of larger diameter than said lower roll to provide a greater peripheral surface area engageable with said crop material than provided by said lower roll whereby said upper roll exerts a feeding effect on the crop material more commensurate with the feeding effect exerted by said lower roll.

2. A machine for crushing previously cut crop material as recited in claim 1 wherein said lower resilient roll has a first set of peripheral grooves which extend diagonally in one direction relative to the axis of the roll, and a second set of peripheral grooves which extend diagonally in an opposite direction relative to said roll axis and intersecting said first set of grooves to form separate sections on the periphery of the roll, the number of grooves in said first set of grooves being different from the number of grooves in said second set of grooves.

3. A machine for crushing previously cut crop material resting on the ground comprising a mobile frame adapted to travel forwardly, a lower pick-up crusher roll, means mounting said lower roll on said frame in relatively close proximity to the ground whereby it engages said crop material on said travel of said frame, means rotating said lower roll in such direction that crop material so engaged is lifted and passed over the lower roll, an upper crusher roll mounted on said frame in crop crushing relation to said lower roll, said upper roll being located forwardly of said lower roll and spaced from the ground substantially further than the lower roll whereby the upper roll passes over said crop material on said travel of the frame, said lower roll and said upper roll having axes located in a common plane which forms an acute angle with the ground on the material engaging sides of the rolls, the rotational axis of said upper roll being located in a vertical plane forwardly of all portions of said lower roll, the rotational axis of said lower roll being located in a horizontal plane beneath all portions of said upper roll, said lower roll being resilient and having a periphery with a relatively high coefficient of friction whereby the lifting and feeding of said crop material is facilitated, said upper roll being rigid and having a periphery with a substantially lower coefficient of friction than said lower roll, and said upper roll being of larger diameter than said lower roll to provide a greater peripheral surface area engageable with said crop material than provided by said lower roll whereby said upper roll exerts a feeding effect on the crop material more commensurate with the feeding effect exerted by said lower roll.

References Cited in the file of this patent

UNITED STATES PATENTS

| | | |
|---|---|---|
| 2,114,580 | Thompson | Apr. 19, 1938 |
| 2,572,276 | Moe | Oct. 23, 1951 |
| 2,711,622 | Cunningham | June 28, 1955 |
| 2,731,782 | Mason | Jan. 24, 1956 |
| 2,811,819 | Heth | Nov. 5, 1957 |
| 2,843,990 | Coultas | July 22, 1958 |
| 2,906,076 | McCarty et al. | Sept. 29, 1959 |
| 2,911,780 | Brady | Nov. 10, 1959 |
| 2,921,426 | Heth | Jan. 19, 1960 |